(12) United States Patent
Guo

(10) Patent No.: US 9,917,641 B2
(45) Date of Patent: Mar. 13, 2018

(54) OPTICAL POWER DATA PROCESSING METHOD, DEVICE AND COMPUTER STORAGE MEDIUM

(71) Applicant: ZTE Corporation, Shenzhen (CN)

(72) Inventor: Wenting Guo, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/024,151

(22) PCT Filed: Apr. 14, 2014

(86) PCT No.: PCT/CN2014/075252
§ 371 (c)(1),
(2) Date: Mar. 23, 2016

(87) PCT Pub. No.: WO2015/039430
PCT Pub. Date: Mar. 26, 2015

(65) Prior Publication Data
US 2016/0233957 A1    Aug. 11, 2016

(30) Foreign Application Priority Data

Sep. 23, 2013  (CN) .......................... 2013 1 0435828

(51) Int. Cl.
*H04B 10/079*    (2013.01)
*H04B 10/27*    (2013.01)
(Continued)

(52) U.S. Cl.
CPC ... *H04B 10/07955* (2013.01); *H04B 10/0793* (2013.01); *H04B 10/27* (2013.01); *H04L 41/12* (2013.01); *H04L 43/045* (2013.01)

(58) Field of Classification Search
None
See application file for complete search history.

(56) References Cited

U.S. PATENT DOCUMENTS 5,970,484 A * 10/1999 Church ............ G06F 17/30253
2003/0058496 A1    3/2003 Obeda
(Continued)

FOREIGN PATENT DOCUMENTS

CN    101018089 A    8/2007
CN    101202670 A    6/2008
(Continued)

OTHER PUBLICATIONS

International Search Report in international application No. PCT/CN2014/075252, dated Jun. 27, 2014.
(Continued)

*Primary Examiner* — Darren E Wolf
(74) *Attorney, Agent, or Firm* — Oppedahl Patent Law Firm LLC

(57) ABSTRACT

Disclosed are an optical power data processing method, device and computer storage medium. The method comprises: building the connection relationships between network elements and links into a topological arrangement; and obtaining optical power data corresponding to the network elements and/or the links via the topological arrangement, the optical power data comprising optical power performance data and optical power threshold data.

9 Claims, 4 Drawing Sheets

(51) Int. Cl.
H04L 12/24 (2006.01)
H04L 12/26 (2006.01)

(56) References Cited

U.S. PATENT DOCUMENTS

2003/0138251 A1   7/2003  Jayaram
2007/0183776 A1   8/2007  Stuart
2010/0138750 A1*  6/2010  Trinler .................. G06F 3/0481
                                                                 715/736

FOREIGN PATENT DOCUMENTS

| CN | 101626313 A | 1/2010 |
| --- | --- | --- |
| CN | 101834757 A | 9/2010 |
| CN | 102014403 A | 4/2011 |
| CN | 102457397 A | 5/2012 |
| CN | 102523037 A | 6/2012 |
| CN | 102723989 A | 10/2012 |
| CN | 102739306 A | 10/2012 |
| CN | 103188577 A | 7/2013 |
| GB | 2374758 A | 10/2002 |

OTHER PUBLICATIONS

English Translation of the Written Opinion of the International Search Authority in international application No. PCT/CN2014/075252, dated Jun. 27, 2014.
Supplementary European Search Report in European application No. 14846373.0, dated Aug. 8, 2016.

* cited by examiner

OPTICAL POWER DATA PROCESSING METHOD, DEVICE AND COMPUTER STORAGE MEDIUM

TECHNICAL FIELD

The disclosure relates to an optical communication technology in the field of communication, and in particular to an optical power data processing method and device and a computer storage medium.

BACKGROUND

Performance management is an important management function of a network management system, and may realize a function of monitoring real-time performance data which reflects a performance index and running state of network equipment, and ensure effective, stable and secure running of a network. Input optical power performance and output optical power performance of an optical port in network equipment are very important performance monitoring indexes, an optical power performance value is required to be within a reasonable range, optical power exceeding a reasonable range may cause a working abnormity of a network, excessively high optical power may damage a transceiver module in the network equipment, and excessively low optical power may cause an abnormity and even interruption of a service, both of which influences operation of the network. Once being discovered, an optical port with abnormal optical power is required to be timely processed to avoid a potential network engineering failure. Therefore, when optical power performance data of managed network equipment is monitored by a network management system, it is necessary to rapidly and intuitively display an optical power performance state of the network equipment in real time.

In a related technology, an optical power performance state is acquired and displayed in a manner as follows: the optical power performance state of equipment is queried from a server by a network management system client, and is displayed on the network management system client in a table form. Such a querying manner is lower in efficiency because it is usually necessary to query network elements (equivalent to network equipment) one by one; moreover, the table form is unlikely to intuitively reflect whether the optical power performance state of the network equipment is normal or not, and may not rapidly show the optical power performance state of the network equipment; and in the case of a large scale network, it is more difficult to accurately locate network equipment in an abnormal state.

From the above, in the related technology, it is necessary to query network elements one by one to acquire optical power data, so that querying efficiency is lower; and moreover, it is difficult to accurately locate a network element in an abnormal state.

SUMMARY

The embodiments of the disclosure provide an optical power data processing method and device and a computer storage medium, which may conveniently and rapidly acquire optical power data corresponding to network elements and/or links without querying the network elements one by one for acquisition of the optical power data, thereby achieving high querying efficiency.

The technical solutions of the embodiment of the disclosure are implemented as follows.

An embodiment of the disclosure provides an optical power data processing method, including: a topological diagram is established according to a connecting relationship among network elements and a connecting relationship among links; and optical power data corresponding to the network elements and/or links in the topological diagram is acquired, wherein the optical power data may include: optical power performance data and optical power threshold data.

In an embodiment, the method may further include: after the step that the optical power data corresponding to the network elements and/or links in the topological diagram is acquired, optical power performance states of the network elements and/or the links are determined according to the optical power data; and different optical power performance states of the network elements and/or the links are displayed, wherein a way of displaying different optical power performance states may include at least one of: icon rendering, colour rendering and label displaying.

In an embodiment, the step that the optical power performance states of the network elements and/or the links are determined according to the optical power data may include: an optical power performance state of each port of each of the network elements is determined according to the optical power data; a highest-level optical power performance state of all ports of the each of the network elements is selected as the optical power performance state of the each of the network elements; and the optical power performance state of each of the links is determined according to a highest-level optical power performance state of ports on two sides of the each of the links.

In an embodiment, the step that different optical power performance states of the network elements and/or the links are displayed may include: it is decided whether the optical power performance states are within a range indicated by the optical power threshold data; if NO, the optical power performance states are displayed; and if YES, the optical power performance states are not displayed.

In an embodiment, the method may further include: the optical power performance states of the network elements and/or links in the topological diagram are refreshed periodically according to a first preset period and refreshed optical power performance states are displayed; and/or, the optical power performance states of the network elements and/or links in topological subnets of the topological diagram are refreshed according to a second preset period and refreshed optical power performance states are displayed.

An embodiment of the disclosure further provides an optical power data processing device, including: an establishment module, configured to establish a topological diagram according to a connecting relationship among network elements and a connecting relationship among links; and an acquisition module, configured to acquire optical power data corresponding to the network elements and/or links in the topological diagram, wherein the optical power data may include: optical power performance data and optical power threshold data.

In an embodiment, the device may further include: a determination module, configured to determine optical power performance states of the network elements and/or the links according to the optical power data; and a display module, configured to display different optical power performance states of the network elements and/or the links, wherein a way of displaying the different optical power performance states may include at least one of: icon rendering, colour rendering and label displaying.

In an embodiment, the determination module may include: a determination unit, configured to determine an optical power performance state of each port of each of the network elements according to the optical power data; a selection unit, configured to select a highest-level optical power performance state of all ports of the each of the network elements as the optical power performance state of the each of the network elements; and the determination unit being further configured to determine the optical power performance state of each of the links according to a highest-level optical power performance states of ports on two sides of the each of the links.

In an embodiment, the display module may include: a decision unit, configured to decide whether the optical power performance states are within a range indicated by the optical power threshold data; and a display unit, configured to display the optical power performance states when the optical power performance states are not within the range indicated by the optical power threshold data, and not display the optical power performance states when the optical power performance states are within the range indicated by the optical power threshold data.

In an embodiment, the device may further include: a refreshing module, configured to refresh periodically the optical power performance states of the network elements and/or links in the topological diagram according to a first preset period and display refreshed optical power performance states; and/or, refresh periodically the optical power performance states of the network elements and/or links in topological subnets of the topological diagram according to a second preset period.

An embodiment of the disclosure further provides a computer storage medium having stored therein computer executable instructions for performing the abovementioned optical power data processing method.

By means of the technical solutions of the embodiments of the disclosure, the topological diagram between the network elements and the links is established, and the optical power data is acquired through the topological diagram, so that related operations are performed in a more intuitive, convenient and rapid way and the optical power data may be acquired without querying the network elements one by one, thereby achieving high querying efficiency and facilitating locating of a network element in an abnormal state.

DETAILED DESCRIPTION

In order to solve the problem of lower querying efficiency caused by a requirement of one-by-one querying of network elements for acquisition of optical power data in the related technology, the embodiments of the disclosure provide an optical power data processing method and device and a computer storage medium, which will be further described below with reference to the drawings and embodiments in detail. It should be understood that the specific embodiments described here are only adopted to explain the disclosure and not intended to limit the disclosure; and technical characteristics in the embodiment of the disclosure may be freely combined under the condition of no conflicts.

Figure 1:
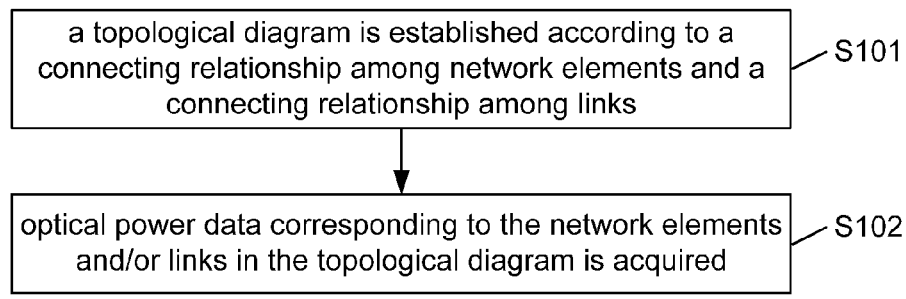
FIG. 1 is a flowchart of an optical power data processing method according to an embodiment of the disclosure.

An embodiment of the disclosure provides an optical power data processing method, and a flow of the method, as shown in FIG. 1, includes Step 101 to Step 102.

Step 101, a topological diagram is established according to a connecting relationship among network elements and a connecting relationship among links.

The network elements are connected through the links, the connecting relationships among the network elements and among the links are displayed through a data table in the related technology, and in the embodiment, a network management system client (equipment) establishes the topological diagram for the connecting relationship among the network elements and the connecting relationship among the links to facilitate operation by a user, and then the user may know a current network state by observing the topological diagram. Because there are many network elements and links, the network management system client may set a multi-level topological diagram according to a practical condition of a network, that is, one topological diagram includes multiple areas (topological subnets), and when the user clicks a certain area (topological subnet) in the topological diagram, the network management system client may display topological diagram corresponding to the area.

Step 102, optical power data corresponding to the network elements and/or links in the topological diagram is acquired, wherein the optical power data may include: optical power performance data and optical power threshold data.

During initialization of the network management system client, the optical power data of all the network elements and links in the topological diagram is acquired. If the user needs to query the optical power data of a certain network element, the user may click the network element in the topological diagram, and then the network management system client may display detailed optical power information of the network element in a table form in any area (for example, an area below the topological diagram) except a display area of the topological diagram; and if the topological diagram is set into a form of multi-level topology, the network management system client supports displaying of a topological diagram of lower-level network elements and/or links included in a level of topology when the user clicks topology of said level, and supports the user to query the optical power data of the displayed network elements or links.

In the embodiment of the disclosure, the optical power data is acquired through the topological diagram in a more intuitive, convenient and rapid way, and the problem of lower querying efficiency caused by the requirement of one-by-one querying of the network elements for acquisition of the optical power data in the related technology is solved.

After the optical power data corresponding to the network elements and/or links in the topological diagram is acquired from a server, the network management system client determines optical power performance states of the network elements and/or the links according to the optical power data returned by the server, and displays the network elements and/or the links according to different optical power performance states, wherein a display manner may be rendering icons into different shapes, may also be performing colour rendering on the icons, for example, rendering icons of network elements and/or links in an abnormal state into red, and may further be generating an abnormal labels for the network elements and/or links in the abnormal state for display. Of course, those skilled in the art may also display the optical power performance states of network elements and/or links in a normal state according to a practical requirement.

After the optical power data is acquired through the topological diagram, the network management system client may rapidly and intuitively display the optical power performance states of the network elements and links in the topological diagram in multiple forms in the topological diagram, and operation and maintenance personnel may also rapidly and accurately locate network elements and links of which the optical power performance states are abnormal in the topological diagram.

In an implementation process, a process of determining the optical power performance states of the network elements and/or the links according to the optical power data includes: an optical power performance state of each port of each of the network elements is determined according to the optical power data; a highest-level optical power performance state of all ports of the each of network elements is selected as the optical power performance state of the each of the network elements; and the process of determining the optical power performance states of the network elements and/or the links according to the optical power data further includes: the optical power performance state of each of the links is determined according to a highest-level optical power performance state of ports on two sides of the each of the links. For example, for a unidirectional link, a highest-level optical power performance state in optical power performance states corresponding to output optical power of a source port and to input optical power of a destination port is taken as an optical power performance state of the link; and for a bidirectional link, a highest-level optical power performance state in optical power performance states corresponding to output optical power of a source port, input optical power of the source port, output optical power of a destination port and input optical power of the destination port is taken as an optical power performance state of the link.

When the network elements and/or the links are displayed according to different optical power performance states, whether the determined optical power performance states are within a range indicated by the optical power threshold data or not may be decided at first; if the optical power performance states are not within the range, it is indicated that the network elements and/or the links are in an abnormal state, then the optical power performance states are displayed, and different abnormal levels of the network elements and/or the links may be displayed in different colours during display; and if the optical power performance states are within the range indicated by the optical power threshold data, the optical power performance states may not be displayed. Since the network elements and/or links in a normal state are not displayed, inspection time taken by the user may be saved, and current states of the network elements and/or the links may be more intuitively presented to the user to improve user experiences.

After being requested and obtained for the first time, the optical power performance states are not required to be manually and repeatedly acquired, and the network management system client may automatically acquire the optical power performance states to refresh periodically the optical power performance states of the network elements and/or links in the topological diagram according to a first preset period, and similarly, may also automatically acquire the optical power performance states in topological subnets of the topological diagram to refresh periodically the optical power performance states in the topological subnets of the topological diagram according to a second preset period and display refreshed optical power performance states, wherein lengths of the first preset period and the second preset period may be the same, and may also be different.

An embodiment of the disclosure further records a computer storage medium having stored therein computer-executable instructions for performing the optical power data processing method shown in FIG. 1.

An embodiment of the disclosure further records an optical power data processing device. The device may be arranged in a network management system client (equipment) on a user side, and its structure diagram is shown in FIG. 2, including: an establishment module 10, configured to establish a topological diagram according to connecting relationships among network elements and among links; and an acquisition module 20, coupled to the establishment module 10 and configured to acquire optical power data corresponding to the network elements and/or links in the topological diagram, wherein the optical power data includes: optical power performance data and optical power threshold data.

Figure 2:
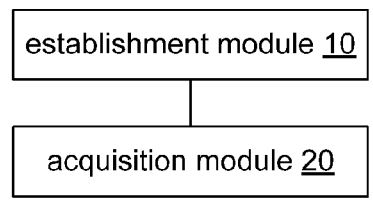
FIG. 2 is a first structure diagram of an optical power data processing device according to an embodiment of the disclosure.
Figure 3:
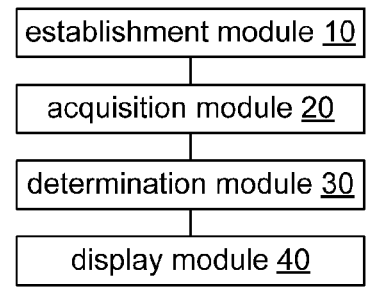
FIG. 3 is a second structure diagram of an optical power data processing device according to an embodiment of the disclosure.

FIG. 3 is another structure diagram of an optical power data processing device, and based on FIG. 2, the optical power data processing device further includes: a determination module 30, coupled to the acquisition module 20 and configured to determine optical power performance states of the network elements and/or the links according to the optical power data; and a display module 40, coupled to the determination module 30 and configured to display different optical power performance states of the network elements and/or the links, wherein a display manner may include at least one of: icon rendering, colour rendering and label displaying.

Figure 4:
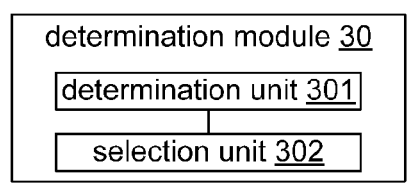
FIG. 4 is a structure diagram of a determination module in an optical power data processing device according to an embodiment of the disclosure.

FIG. 4 is a structure diagram of a determination module 30, and the determination module 30 includes: a determination unit 301, configured to determine an optical power performance states of each port of each of the network elements according to the optical power data; a selection unit 302, coupled to the determination unit 301 and configured to select a highest-level optical power performance state of the ports of the each network element as the optical power performance state of the each of the network elements; and the determination unit 301 being further configured to determine an optical power performance state of each of the links according to a highest-level optical power performance state of ports on two sides of the each of the links.

Figure 5:
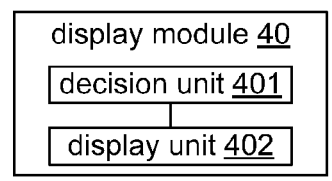
FIG. 5 is a structure diagram of a display module in an optical power data processing device according to an embodiment of the disclosure.

FIG. 5 is a structure diagram of a display module 40, and the display module 40 includes: a decision unit 401, configured to decide whether the optical power performance states are within a range indicated by the optical power threshold data or not; and a display unit 402, coupled to the decision unit 401 and configured to display the optical power performance states when the optical power performance states are not within the range indicated by the optical power threshold data, and not display the optical power performance states when the optical power performance states are within the range indicated by the optical power threshold data.

Figure 6:
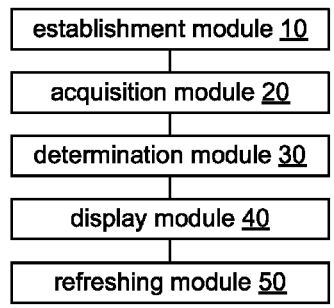
FIG. 6 is a third structure diagram of an optical power data processing device according to an embodiment of the disclosure.

FIG. 6 is another structure diagram of an optical power data processing device, and based on FIG. 3, the device further includes: a refreshing module 50, coupled to the display module 40 and configured to refresh periodically the optical power performance states of the network elements and/or links in the topological diagram according to a first preset period and display refreshed optical power performance states; and/or, refresh periodically the optical power performance states of the network elements and/or links in topological subnets of the topological diagram according to a second preset period.

During a practical application, the abovementioned establishment module 10, acquisition module 20 and determination module 30 can be implemented by a Central Processing Unit (CPU), Digital Signal Processor (DSP) or Field Programmable Gate Array (FPGA) in the optical power data processing device; and the display module 40 can be implemented by a Graphics Processing Unit (GPU) in the optical power data processing device.

An embodiment of the disclosure provides an optical power data processing method, which is applied to a network management system client (equipment), the network management system client being configured with the optical power data processing device shown in any one of FIG. 2 to FIG. 6. By implementing the method, the network management system may acquire optical power data, and may determine optical power performance states of network elements and links according to the acquired optical power data. An implementation flow includes steps as follows.

Step 1, a network management system client displays a topological diagram.

During initialization of the network management system client, the topological diagram is displayed, and a request of querying optical power performance data and threshold data is sent to a server, querying objects being all network elements in the topological diagram; and after receiving the request, the server finds the optical power performance data of all the network elements and the optical power threshold data of the network elements in the latest time granularity, and returns a querying result to the network management system client.

Step 2, the network management system client renders and displays optical power performance states.

The network management system client calculates the optical power performance states of the network elements and links according to the optical power performance data and the optical power threshold data, and renders and displays the optical power performance states of the network elements and links in each topological subnet of the topological diagram. A display manner includes icon rendering, colour rendering, Tooltip displaying (i.e. dialog box appearing when a mouse is placed on an icon without clicking), label displaying and the like. In such display manners, the optical power performance states of the network elements and the links may be clearly displayed in the topological diagram to implement rapid and accurate location.

In Step 2, the network management system client may display the network elements and links in the topological diagram according to different optical power states to facilitate rapid location of network elements and links with abnormal optical power.

Step 3, the network management system client sets an automatic refreshing period and periodically find the latest optical power performance states to refresh and display the optical power states in the topological diagram.

Therefore, real-time performance and correctness of optical power state data may be ensured.

Step 4, the topological diagram displayed by the network management system client is switched to topological subnets.

When switching the displayed topological diagram into a topological subnet of the topological diagram in response to operation of a user, the network management system client detects at first whether there exists the optical power data of network elements in the topological subnet in a memory, and if NO, queries the optical power data of the network elements in the latest time granularity and renders and displays the network elements and links.

Besides periodically and automatically displaying and refreshing the optical power states, the network management system client also supports refreshing and displaying of optical power performance states of network elements and links specified by the user or network elements in a topological subnet specified by the user.

Step 5, optical power threshold data is displayed and modified.

When the user selects a network element and/or link in the topological diagram, the network management system client may display detailed optical power information and transceiver module information of the selected network element and/or link in a table form below the topological diagram, and supports the user to regulate an optical power performance threshold in the table.

Step 3, Step 4 and Step 5 may be executed in an arbitrary sequence.

During implementation, each process above may be further divided.

For example, the operation that the acquired optical power state data is displayed and rendered in Step 2 may be implemented by Step 2.1 to Step 2.5:

Step 2.1, an optical power performance state (including normal, early warning and threshold exceeding) of each port in a network element is calculated, wherein the port refers to a port with optical power performance.

Wherein, whether performance values corresponding to the optical power performance states are correct or not may be decided with reference to the following standards:

threshold exceeding: performance value<lower threshold, or, performance value> higher threshold;

early warning: lower threshold<performance value<lower early warning threshold, or, higher early warning threshold<performance value<higher threshold; and normal: lower early warning threshold<=performance value<=higher early warning threshold.

The optical power performance includes input optical power and output optical power, and the highest-level state of the input optical power and the output optical power is taken as the optical power performance state of a port. Levels of the optical power performance states are: normal<early warning<threshold exceeding.

Step 2.2, the optical power performance state of the network element is calculated according to the optical power performance state of each port in the network element, a calculation manner being taking a highest-level optical power performance state of the ports as the optical power performance state of the network element.

Step 2.3, an optical power performance state of a link is calculated according to a highest-level optical power performance state of ports on two sides of the link.

A calculation manner is as follows: for a unidirectional link, a highest-level optical power performance state in output optical power of a source port and input optical power of a destination port is taken as an optical power performance state of the link; and for a bidirectional link, a highest-level optical power performance state in a source port and a destination port is taken as an optical power performance state of the link.

Step 2.4, icons are added to network elements in the early warning and threshold limiting states in the topological diagram for display according to the optical power performance states of the network elements, and colours of links in the early warning and threshold limiting states in the topological diagram are rendered according to the optical power performance states of the links.

Step 2.5, the numbers of the ports in the abnormal optical power states in the network elements are displayed in Tooltips of the network elements, and input and output optical power performance values are displayed in labels and Tooltips of the links.

Wherein, colours for the abnormal optical power states may be customized, and as a default, the early warning state is set into yellow, the threshold exceeding state is set into red, and other colours may be customized.

Periodic refreshing of the optical power performance states in Step 3 may be implemented by Step 3.1 to Step 3.2.

Step 3.1, the network management system client sets the automatic refreshing period, automatic refreshing being performed by time granularity as a default; and Step 3.2, the network management system client sends a request for querying the optical power performance data and the optical power threshold data to the server, the querying objects being all the network elements in the topological diagram; and after receiving the request, the server finds the optical power performance data and optical power threshold data in the latest time granularity, and returns the querying result to the network management system client.

For network elements of which the optical power data is not found in Step 3.2, the optical power performance states of the network elements in the topological diagram are recovered into normal at first, displaying of the input optical power data and output optical power data of the related links of the network elements is stopped, and the optical power performance states of the related links of the network elements are recalculated.

For the network elements of which the optical power data is found in Step 3.2, the optical power performance states of the ports in the network elements are recalculated according to the optical power threshold data and the optical power performance data, and the optical power performance states of the network elements and the related links of the network elements in the topological diagram are rendered and displayed.

The operation that the optical power threshold data is displayed and modified in Step 5 may be implemented by the following steps:

Step 5.1, when the user selects a network element in the topological diagram, the network management system client displays detailed optical power information and transceiver module information of ports in the selected network element in the table form below the topological diagram; and Step 5.2, when the user selects a link in the topological diagram, the network management system client displays detailed optical power information and transceiver module information of ports on two sides of the selected link in the table form below the topological diagram.

Wherein, the order of Step 5.1 and Step 5.2 may be reversed, and different power optical performance states in the table are distinguished by different colours, and the colours are kept consistent with the colours of the optical power performance states in the topological diagram;

the network management system client supports the user to regulate optical power thresholds of each port in the optical power information tables of the network elements and the links; and multiple setting manners of setting by percentage, setting by deviation value and the like are provided, and the user is supported to simultaneously modify multiple network elements to rapidly regulate the thresholds. The performance threshold data may be stored in the network management system client and a network management database; and after the user finishes setting the optical power thresholds of the network elements, the network management system client re-queries the optical power performance states of the network elements to render and display the network elements and the links according to the process in Step 3 and the new thresholds.

Compared with the related technology, the method of the embodiment has the advantages that the optical power performance states of the network elements and the links may be rapidly and intuitively displayed in multiple forms in the topological diagram displayed on the network management system client, and the operation and maintenance personnel may rapidly and accurately locate the network elements and links in the abnormal optical power performance states in the topological diagram; the data may be automatically refreshed, and changes in the optical power performance states of the network elements and the links may be automatically displayed, so that operability and usability of the network management system client are improved; and in addition, the optical power performance thresholds of the ports in the network elements may also be regulated in batches, so that accuracy of the data is ensured, and maintainability of a network is improved.

The abovementioned process will be described below with reference to the drawings in detail.

Figure 7:
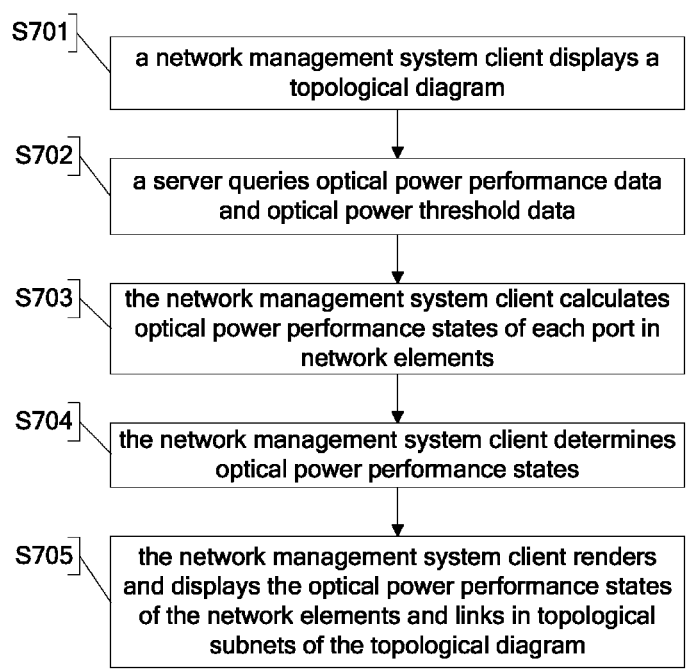
FIG. 7 is a flowchart of initialization of optical power data according to an embodiment of the disclosure.

FIG. 7 is a flowchart of initialization of optical power data according to an embodiment, and as shown in FIG. 7, the flow includes Step 701 to Step 705.

Step 701, the network management system client displays the topological diagram.

In a transport network management system, the network management system client displays the topological diagram, and sends the request of querying the optical power performance data and the optical power threshold data in the latest time granularity to the server, the querying objects being all the network elements in the topological diagram.

Step 702, the server queries the optical power performance data and the optical power threshold data.

After receiving the querying request, the server finds the optical power performance data and optical power threshold data meeting a condition, and returns the querying result to the client.

Step 703, the network management system client calculates the optical power performance states of each port in a network element.

The network management system client calculates the optical power performance state (normal, early warning and threshold exceeding) of each port in the network element according to found optical power performance values and optical power thresholds; and optical power performance includes input optical power and output optical power, and a highest-level optical power performance state in optical power performance states corresponding to the input optical power and the output optical power is taken as the optical power performance state of the port.

Step 704, the network management system client determines the optical power performance state.

The highest-level optical power performance state in the optical power performance states corresponding to the states of each port is taken as the optical power performance state of the network element according to the optical power performance states of each port in the network element; and the optical power performance state of a link is calculated according to a highest-level state of ports on the two sides of the link, and the calculation manner is as follows: for a unidirectional link, a highest-level optical power performance state in optical power performance states corresponding to output optical power of a source port and input optical power of a destination port is taken as an optical power performance state of the link; and for a bidirectional link, a highest-level optical power performance state in optical power performance states corresponding to a source port and a destination port is taken as an optical power performance state of the link.

Step 705, the network management system client renders and displays the optical power performance states of the network elements and links in the topological subnets of the topological diagram.

A rendering manner for the network elements is as follows: the icons (two different icons are adopted for identification of early warning and threshold exceeding) are added to the network elements in the early warning and threshold limiting states in the topological diagram for display, and the numbers of the ports in the early warning state and the numbers of the ports in the threshold exceeding state in the network elements are displayed in the Tooltips of the network elements;

a rendering manner for the links is as follows: the links in the early warning and threshold limiting states in the topological diagram are rendered in different colours;

for a bidirectional link, respective input and output optical power performance values of a source port and a destination port are displayed above two sides of the link in a label form, and detailed input optical power or output optical power information of the ports on the two sides of the link is displayed in a Tooltip of the link; and for a unidirectional link, an output optical power performance value of a source port and an input optical power performance value of a destination port are displayed above two sides of the link in the label form, and respective detailed input optical power and output optical power information of the ports on the two sides of the link is displayed in a Tooltip of the link.

During implementation, the colours of the abnormal optical power states may be customized, and as a default, the early warning state is set into yellow, the threshold exceeding state is set into red, and the other colours may be customized; and the network elements and links in the topological diagram may be filtered according to different optical power performance states to rapidly locate the network elements and links with abnormal optical power.

Figure 8:
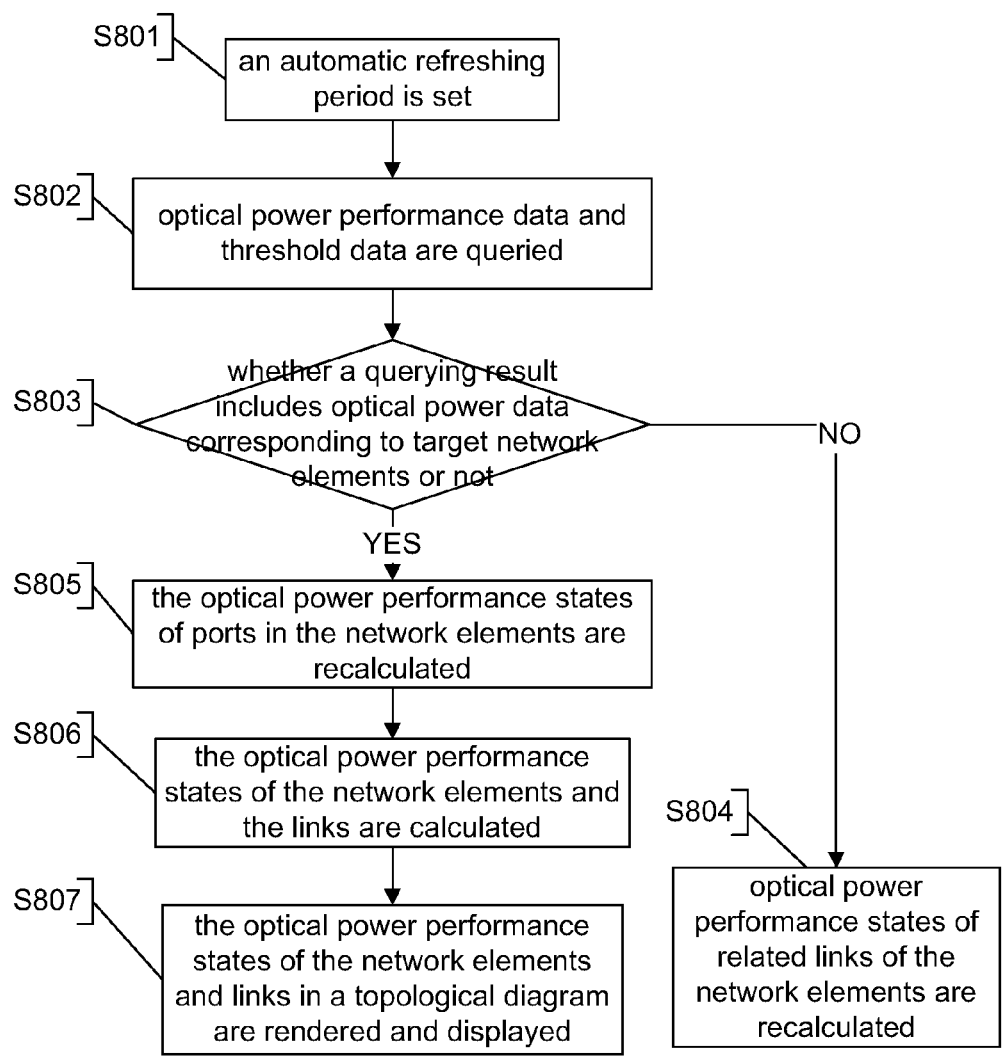
FIG. 8 is a flowchart of refreshing and displaying optical power performance states according to an embodiment of the disclosure.

FIG. 8 is a flowchart of refreshing optical power performance states according to an embodiment, and as shown in FIG. 8, the process includes Step 801 to Step 807.

Step 801, the network management system client sets the automatic refreshing period, automatic refreshing being performed by time granularity as a default.

Step 802, the network management system client periodically queries the optical power performance data and the optical power threshold data.

The network management system client sends the request to the server for all the network elements in the topological diagram so that the server finds the optical power performance data and the optical power threshold data from a network management database; and after receiving the request, the server finds the latest optical power performance data and threshold data, and returns the querying result to the client.

Step 803, the network management system client detects whether the querying result includes optical power data corresponding to target network elements or not, Step 805 is executed if YES; otherwise, Step 804 is executed and the process ends.

Step 804, the optical power performance states of the related links of the network elements are recalculated.

For network elements of which the optical power data is not found, the optical power performance states of the network elements are recovered into normal (optical power state icons of the network elements in the figure are removed, and the numbers of the ports in the early warning and threshold exceeding states in the Tooltips of the network elements are set into 0); and displaying of the input optical power data and output optical power data of the related links of the network elements is stopped, the optical power performance states of links are recalculated, and the state colours and link Tooltips of the links are updated.

Step 805, the optical power performance states of the ports in the network elements are recalculated.

For network elements of which the optical power data is found, the optical power performance states of the ports in the network elements are recalculated according to the optical power performance values and the optical power thresholds.

Step 806, the optical power performance states of the network elements and the related links are calculated according to the optical power performance states of each port in the network elements.

Step 807, the optical power performance states of the network elements and the related links in the topological diagram are rendered and displayed.

Figure 9:
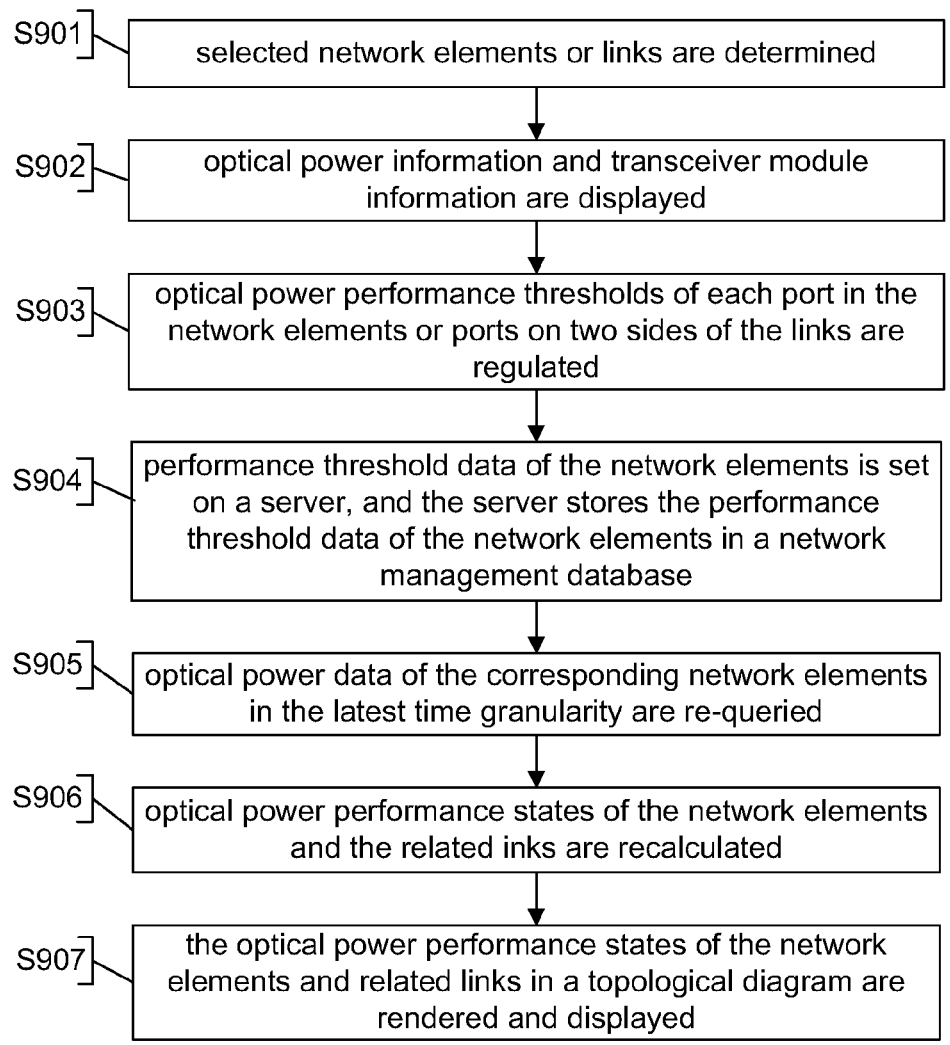
FIG. 9 is a flowchart of setting optical power threshold data according to an embodiment of the disclosure.

FIG. 9 is a flowchart of setting optical power threshold data according to an embodiment, and as shown in FIG. 9, the flow includes Step 901 to Step 907.

Step 901, the network management system client determines network elements or links selected from the displayed topological diagram by the user.

Multiple network elements or links may be selected.

Step 902, detailed optical power information and transceiver module information of ports in the selected network elements or the ports on the two sides of the selected links are displayed.

The detailed optical power information and transceiver module information of the ports in the selected network elements or the ports on the two sides of the links are correspondingly displayed below the topological diagram in the table form. Wherein, different optical power performance states are distinguished by different colours in the table, and the colours are kept consistent with the colours of the optical power performance states in the topological diagram.

Step 903, the optical power performance thresholds of each port in the network elements or the ports on the two sides of the links are regulated in the optical power information table of the network elements or the links.

The network management system client supports the user to simultaneously modify the optical power performance thresholds of multiple network elements, and several setting manners of setting by percentage (for example, higher and lower early warning thresholds are regulated according to percentages of the higher and lower thresholds in a reference value), setting by deviation value (for example, the higher and lower early warning thresholds are regulated according to positive and negative deviations from the reference value and the higher and lower thresholds are regulated according to positive and negative deviations from a default threshold) and the like are provided to rapidly regulate the thresholds.

Step 904, the network management system client sends a setting request to the server, and sets the performance threshold data of the network elements onto the server, and the server stores the performance threshold data of the network elements in the network management database.

Step 905, after finishing setting the performance thresholds of the network elements, the network management system client re-queries the optical power data of the corresponding network elements in the latest time granularity.

Step 906, the network management system client recalculates the optical power performance states of the network elements and the related links.

Step 907, the optical power performance states of the network elements and related links in the topological diagram are rendered and displayed.

In the embodiment, the network management system client may rapidly and Intuitively display the optical power performance states of the network elements and the links in the displayed topological diagram in multiple forms, and the operation and maintenance personnel may rapidly and accurately locate the network elements and links in the abnormal optical power performance states in the topological diagram; the data may be automatically refreshed, and changes in the optical power performance states of the network elements and the links may be automatically displayed, so that operability and usability of the network management system client in monitoring the optical power performance states of equipment are improved; and in addition, the optical power performance thresholds of the ports in the network elements and the ports on the two sides of the links may also be regulated in batches, so that accuracy of the optical power state data is ensured, and maintainability of the network is improved.

Those skilled in the art should know that the embodiment of the disclosure may be provided as a method, a system or a computer program product. Moreover, the disclosure may adopt a form of computer program product implemented on one or more computer-available storage media (including, but not limited to, a disk memory, an optical memory and the like) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred implementation mode of the embodiment of the disclosure, it is important to point out that those skilled in the art may also make a plurality of improvements and embellishments without departing from the principle of the embodiment of the disclosure, and these improvements and embellishments shall fall within the scope of protection of the disclosure.

What is claimed is:

1. An optical power data processing method, comprising:
displaying, by a network management system client, a topological diagram indicating a connecting relationship among network elements and a connecting relationship among links;
sending, by the network management system client to a server, a query request for acquiring optical power data corresponding to the network elements and/or links in the topological diagram, wherein the optical power data comprises: optical power performance data and optical power threshold data;
determining, by the network management system client, optical power performance states of the network elements and/or the links according to the acquired optical power data; and
displaying, by the network management system client, the network elements and/or the links according to different optical power performance states, wherein the optical power performance states comprise: normal, early warning and threshold exceeding, and a way of displaying the network elements and/or the links comprises at least one of: icon rendering, colour rendering and label displaying,
wherein the method further comprises:
displaying changes in the optical power performance states of the network elements and the links,
and wherein determining, by the network management system client, the optical power performance states of the network elements and/or the links according to the acquired optical power data comprises:
determining, by the network management system client, an optical power performance state of each port of each of the network elements according to the optical power data;

selecting, by the network management system client, a highest-level optical power performance state of all ports of the each of the network elements as the optical power performance state of the each of the network elements; and determining, by the network management system client, the optical power performance state of each of the links according to a highest-level optical power performance state of ports on two sides of the each of the links.

2. The method according to claim 1, wherein displaying, by the network management system client, the network elements and/or the links according to different optical power performance states comprises:

deciding, by the network management system client, whether the optical power performance states are within a range indicated by the optical power threshold data;

if the optical power performance states are not within the range indicated by the optical power threshold data, displaying the optical power performance states of the network elements and/or the links; and if the optical power performance states are within the range indicated by the optical power threshold data, not displaying the optical power performance states of the network elements and/or the links.

3. The method according to claim 1, further comprising:

refreshing periodically the optical power performance states of the network elements and/or links in the topological diagram according to a first preset period and displaying refreshed optical power performance states; and/or, refreshing periodically optical power performance states of network elements and/or links in topological subnets of the topological diagram according to a second preset period and displaying refreshed optical power performance states.

4. An optical power data processing device, comprising:
a memory storing processor-executable instructions; and
a processor arranged to execute the stored processor-executable instructions to perform steps of:

displaying, by a network management system client, a topological diagram indicating a connecting relationship among network elements and a connecting relationship among links;

sending, by the network management system client to a server, a query request for acquiring optical power data corresponding to the network elements and/or links in the topological diagram, wherein the optical power data comprises: optical power performance data and optical power threshold data;

determining, by the network management system client, optical power performance states of the network elements and/or the links according to the acquired optical power data; and displaying, by the network management system client, the network elements and/or the links according to different optical power performance states, wherein the optical power performance states comprise: normal, early warning and threshold exceeding, and a way of displaying the network elements and/or the links comprises at least one of: icon rendering, colour rendering and label displaying, wherein the processor is arranged to execute the stored processor-executable instructions to further perform a step of:

displaying changes in the optical power performance states of the network elements and the links, and wherein determining, by the network management system client, the optical power performance states of the network elements and/or the links according to the acquired optical power data comprises:

determining, by the network management system client, an optical power performance state of each port of each of the network elements according to the optical power data;

selecting, by the network management system client, a highest-level optical power performance state of all ports of the each of the network elements as the optical power performance state of the each of the network elements; and determining, by the network management system client, the optical power performance state of each of the links according to a highest-level optical power performance state of ports on two sides of the each of the links.

5. The device according to claim 4, wherein displaying, by the network management system client, the network elements and/or the links according to different optical power performance states comprises:

deciding, by the network management system client, whether the optical power performance states are within a range indicated by the optical power threshold data;

if the optical power performance states are not within the range indicated by the optical power threshold data, displaying the optical power performance states of the network elements and/or the links; and if the optical power performance states are within a range indicated by the optical power threshold data, not displaying the optical power performance states of the network elements and/or the links.

6. The device according to claim 4, wherein the processor is arranged to execute the stored processor-executable instructions to further perform a step of:

refreshing periodically the optical power performance states of the network elements and/or links in the topological diagram according to a first preset period; and/or, refreshing periodically optical power performance states of network elements and/or links in topological subnets of the topological diagram according to a second preset period.

7. A non-transitory computer storage medium having stored therein computer executable instructions for performing an optical power data processing method, the method comprising:

displaying, by a network management system client, a topological diagram indicating a connecting relationship among network elements and a connecting relationship among links;

sending, by the network management system client to a server, a query request for acquiring optical power data corresponding to the network elements and/or links in the topological diagram, wherein the optical power data comprises: optical power performance data and optical power threshold data;

determining, by the network management system client, optical power performance states of the network elements and/or the links according to the acquired optical power data; and displaying, by the network management system client, the network elements and/or the links according to different optical power performance states, wherein the optical power performance states comprise: normal, early warning and threshold exceeding, and a way of displaying the network elements and/or the links comprises at least one of: icon rendering, colour rendering and label displaying,
wherein the method further comprises:
displaying changes in the optical power performance states of the network elements and the links,
and wherein determining, by the network management system client, the optical power performance states of the network elements and/or the links according to the acquired optical power data comprises:
determining, by the network management system client, an optical power performance state of each port of each of the network elements according to the optical power data;
selecting, by the network management system client, a highest-level optical power performance state of all ports of the each of the network elements as the optical power performance state of the each of the network elements; and
determining, by the network management system client, the optical power performance state of each of the links according to a highest-level optical power performance state of ports on two sides of the each of the links.

8. The method according to claim 1, wherein a rendering manner for the network elements is as follows: adding different icons for network elements in the early warning and threshold exceeding states in the topological diagram for identification of the network elements in the early warning and threshold exceeding states, and displaying, in Tooltips of the network elements, the numbers of ports in the early warning state and the numbers of ports in the threshold exceeding state in the network elements; and
a rendering manner for the links is as follows: rendering, in different colours, links in the early warning and threshold limiting states in the topological diagram.

9. The device according to claim 4, wherein a rendering manner for the network elements is as follows: adding different icons for network elements in the early warning and threshold exceeding states in the topological diagram for identification of the network elements in the early warning and threshold exceeding states, and displaying, in Tooltips of the network elements, the numbers of ports in the early warning state and the numbers of ports in the threshold exceeding state in the network elements; and
a rendering manner for the links is as follows: rendering, in different colours, links in the early warning and threshold limiting states in the topological diagram.

* * * * *